United States Patent
Wei et al.

(10) Patent No.: US 12,344,207 B2
(45) Date of Patent: Jul. 1, 2025

(54) VEHICLE CONTROL METHOD AND DEVICE, STORAGE MEDIUM, AND VEHICLE

(71) Applicant: NIO TECHNOLOGY (ANHUI) CO., LTD, Hefei (CN)

(72) Inventors: Qiang Wei, Shanghai (CN); Xianhui Zhang, Shanghai (CN); Da Yuan, Shanghai (CN); Shengwei Deng, Shanghai (CN); Liren Wu, Shanghai (CN); Bohong Xiao, Shanghai (CN); Mingyuan Wang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 316 days.

(21) Appl. No.: 18/046,184

(22) Filed: Oct. 13, 2022

(65) Prior Publication Data
US 2023/0115978 A1  Apr. 13, 2023

(30) Foreign Application Priority Data
Oct. 13, 2021  (CN) .......................... 202111192654.5

(51) Int. Cl.
*B60T 13/66* (2006.01)
*B60T 13/74* (2006.01)
(52) U.S. Cl.
CPC ............ *B60T 13/66* (2013.01); *B60T 13/745* (2013.01)
(58) Field of Classification Search
CPC ............................... B60T 13/66; B60T 13/745
See application file for complete search history.

(56) References Cited

U.S. PATENT DOCUMENTS 4,827,807 A * 5/1989 Hayakawa ........... B60K 17/344
                                                  180/247
2005/0264099 A1* 12/2005 Kamiya .................... B60T 7/22
                                                  303/15

(Continued)

FOREIGN PATENT DOCUMENTS

CN    106627547    5/2017
CN    109435941    3/2019

(Continued)

OTHER PUBLICATIONS

Official Action with English Translation for China Patent Application No. 202111192654.5, dated May 24, 2024, 13 pages.

(Continued)

*Primary Examiner* — John Kwon
(74) *Attorney, Agent, or Firm* — Sheridan Ross P.C.

(57) ABSTRACT

The disclosure relates to a vehicle control method. The vehicle control method includes: receiving a first control instruction; sending a first output signal based on the first control instruction, where the first output signal is used to instruct a hydraulic parking system to start pressure build-up; and sending a second output signal upon the hydraulic parking system reaching a predetermined first state, where the second output signal is used to instruct an electronic parking system to start to be pulled up or released. The disclosure further relates to a vehicle control device, a computer-readable storage medium, and a vehicle. According to the vehicle control solution provided in the disclosure, a hydraulic parking system and an electronic parking system are controlled in a coupled manner in vehicle starting and stopping conditions, thereby providing a user with highly comfortable, reliable, and safe vehicle starting and stopping experience.

10 Claims, 3 Drawing Sheets

(56) References Cited

U.S. PATENT DOCUMENTS

| | | | |
|---|---|---|---|
| 2009/0145674 A1* | 6/2009 | Lee | B60L 50/16 |
| | | | 333/182 |
| 2015/0344007 A1* | 12/2015 | Lee | B60T 13/662 |
| | | | 701/70 |
| 2018/0043895 A1 | 2/2018 | Shami et al. | |
| 2019/0039425 A1* | 2/2019 | Dodd | B60W 10/20 |
| 2020/0361431 A1* | 11/2020 | Park | B60T 7/12 |
| 2021/0171000 A1* | 6/2021 | Hesseler | B60T 8/172 |
| 2024/0239323 A1* | 7/2024 | Ling | B60T 13/588 |

FOREIGN PATENT DOCUMENTS

| | | |
|---|---|---|
| CN | 110194170 | 9/2019 |
| CN | 112109690 | 12/2020 |
| DE | 19632863 | 2/1998 |
| DE | 102005023665 | 11/2006 |
| DE | 112017004784 | 6/2019 |
| JP | 2018-135040 | 8/2018 |
| WO | WO 2015/075526 | 5/2015 |

OTHER PUBLICATIONS

Extended Search Report for European Patent Application No. 22201092.8, dated Feb. 21, 2023, 8 pages.

* cited by examiner

VEHICLE CONTROL METHOD AND DEVICE, STORAGE MEDIUM, AND VEHICLE

CROSS-REFERENCE TO RELATED APPLICATIONS

This application claims the benefit of China Patent Application No. 202111192654.5 filed Oct. 13, 2021, the entire contents of which are incorporated herein by reference in its entirety.

TECHNICAL FIELD

The disclosure relates to the technical field of vehicle control, and in particular to a vehicle control method and device, a computer-readable storage medium, and a vehicle.

BACKGROUND

At present, traditional parking systems include a mechanical parking system, an electronic parking brake (EPB) system, a hydraulic parking system, and the like.

The hydraulic parking system is a technology that implements vehicle braking in a hydraulic manner. Generally, the hydraulic parking system is provided as an extension of an electronic stability program (ESP) of a vehicle. In a hydraulic parking mode, a processor measures levelness of the vehicle and a torque of wheels through a series of sensors, make a determination on a flow trend of the vehicle, and apply an appropriate braking force to the wheels to make the vehicle stand still; and when the vehicle starts to move forward, an electronic system detects parameters such as a braking force of the accelerator to determine whether the brake is released. This is especially suitable for use in urban areas with frequent traffic lights or scenarios with many up and down slopes, which can greatly simplify user operations and provide users with convenience. However, a separate hydraulic parking system cannot meet a functional safety backup requirement when parking fails under an automatic driving condition, and maintaining a high hydraulic pressure for a long time may cause problems such as overheating of a brake motor.

The EPB system is a technology that implements parking braking by using an electronic control method, and its function is similar to a mechanical lever handbrake. The EPB system can automatically apply parking braking after an engine is turned off. In addition, with the EPB system, a user does not need to manually turn off an electronic handbrake when a vehicle starts again, because the electronic handbrake is automatically turned off when the vehicle starts by stepping on an accelerator. This makes starting and stopping of a vehicle more convenient and reliable. However, the EPB system has relatively long response time of pulling up and releasing, failing to implement same quick response as the hydraulic parking system. Moreover, the EPB system cannot implement pressure build-up control with a slop like the hydraulic parking system. Therefore, use of the EPB system alone may have problems such as slippage and long response time.

BRIEF SUMMARY

According to an aspect of the disclosure, a vehicle control method is provided. The vehicle control method includes: receiving a first control instruction; sending a first output signal based on the first control instruction, wherein the first output signal is used to instruct a hydraulic parking system to start pressure build-up; and sending a second output signal upon the hydraulic parking system reaching a predetermined first state, where the second output signal is used to instruct an electronic parking system to start to be pulled up or released.

As an alternative or addition to the foregoing solution, the vehicle control method according to an embodiment of the disclosure further includes: sending a third output signal upon the electronic parking system reaching a predetermined second state. The third output signal is used to instruct the hydraulic parking system to start to release pressure.

As an alternative or addition to the foregoing solution, in the vehicle control method according to an embodiment of the disclosure, the first control instruction includes a stopping instruction and a starting instruction. When the first control instruction is the stopping instruction, the second output signal is used to instruct the electronic parking system to start to be pulled up. When the first control instruction is the starting instruction, the second output signal is used to instruct the electronic parking system to start to be released.

As an alternative or addition to the foregoing solution, in the vehicle control method according to an embodiment of the disclosure, when the first control instruction is the stopping instruction, the first state of the hydraulic parking system includes that pressure build-up has been completed for a first time threshold and pressure build-up has not been completed after a second time threshold.

As an alternative or addition to the foregoing solution, in the vehicle control method according to an embodiment of the disclosure, when the first control instruction is the stopping instruction, the second state of the electronic parking system includes that the electronic parking system has been fully pulled up for a third time threshold.

As an alternative or addition to the foregoing solution, in the vehicle control method according to an embodiment of the disclosure, when the first control instruction is the starting instruction, the first state of the hydraulic parking system includes that pressure build-up has been completed for a fourth time threshold.

As an alternative or addition to the foregoing solution, in the vehicle control method according to an embodiment of the disclosure, the sending of the second output signal is further upon a starting torque being greater than a torque required to overcome a slope.

As an alternative or addition to the foregoing solution, in the vehicle control method according to an embodiment of the disclosure, when the first control instruction is the starting instruction, the second state of the electronic parking system includes that the electronic parking system has been fully released for a fifth time threshold.

According to another aspect of the disclosure, a vehicle control device is provided. The vehicle control device includes a receiving apparatus, configured to receive a first control instruction. The vehicle control device further includes a sending apparatus, configured to: send a first output signal based on the first control instruction, and send a second output signal upon a hydraulic parking system reaching a predetermined first state. The first output signal is used to instruct the hydraulic parking system to start pressure build-up, and the second output signal is used to instruct an electronic parking system to start to be pulled up or released.

According to another aspect of the disclosure, a vehicle control device is provided, which includes a memory, a processor, and a computer program stored on the memory and executable on the processor. When the computer program is executed by the processor, the vehicle control method described above is implemented.

According to still another aspect of the disclosure, a vehicle is provided, and the vehicle includes any one of the vehicle control devices described above.

According to yet another aspect of the disclosure, a computer-readable storage medium storing a computer program is provided. When the computer program is executed by the processor, the vehicle control method described above is implemented.

According to the vehicle control solution provided in the disclosure, a hydraulic parking system and an electronic parking system are controlled in a coupled manner in vehicle starting and stopping conditions, implementing a function backup in a case of a single function failure, and providing a user with highly comfortable, reliable, and safe vehicle starting and stopping experience.

BRIEF DESCRIPTION OF THE SEVERAL VIEWS OF THE DRAWINGS

The above and other objectives and advantages of the disclosure will be clearer and more thorough from the following detailed description in conjunction with the drawings.

DETAILED DESCRIPTION

It should be noted that the terms such as "first" and "second" herein are intended to distinguish between similar objects, and do not necessarily describe a sequence of objects in terms of time, space, size, and the like. In addition, unless otherwise specified, the terms "including/comprising", "having", and similar expressions herein are intended to mean a non-exclusive inclusion. Furthermore, the term "vehicle" or another similar term herein include general a motor vehicle, such as a passenger vehicle (including a sport utility vehicle, a bus, a trucks, etc.), and various commercial vehicles, and include a hybrid vehicle, an electric vehicle, a plug-in hybrid electric vehicle, and the like. The hybrid vehicle is a vehicle with two or more power sources, such as a vehicle powered by a gasoline engine and an electric motor.

Various exemplary embodiments according to the disclosure will be described below in detail with reference to the accompanying drawings.

Figure 1:
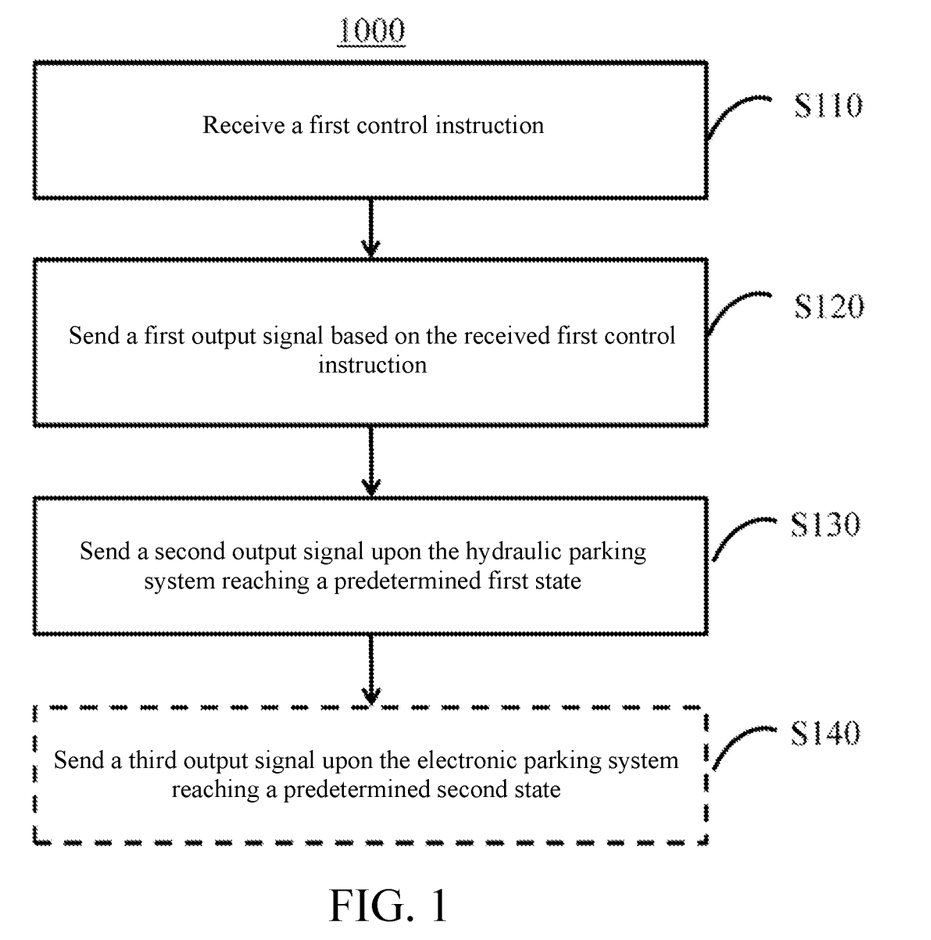
FIG. 1 is a schematic flowchart of a vehicle control method 1000 according to an embodiment of the disclosure.

FIG. 1 is a schematic flowchart of a vehicle control method 1000 according to an embodiment of the disclosure. As shown in FIG. 1, the vehicle control method 1000 includes the following steps.

In step S110, a first control instruction is received. The first control instruction may be a stopping instruction, a starting instruction, and the like for a vehicle.

In step S120, a first output signal is sent based on the first control instruction received in step S110. The first output signal is used to instruct a hydraulic parking system to start pressure build-up.

In the context of the disclosure, the hydraulic parking system "starts pressure build-up" means that a hydraulic pressure of the hydraulic parking system starts to increase.

In step S130, a second output signal is sent upon the hydraulic parking system reaching a predetermined first state. The second output signal is used to instruct the electronic parking system to start to be pulled up or released.

In step S140 (shown in a dashed frame in FIG. 1), a third output signal is sent upon the electronic parking system reaching a predetermined second state. The third output signal is used to instruct the hydraulic parking system to start to release pressure.

In the context of the disclosure, the hydraulic parking system "starts to release pressure" means that the hydraulic pressure of the hydraulic parking system starts to decrease.

Figure 2:
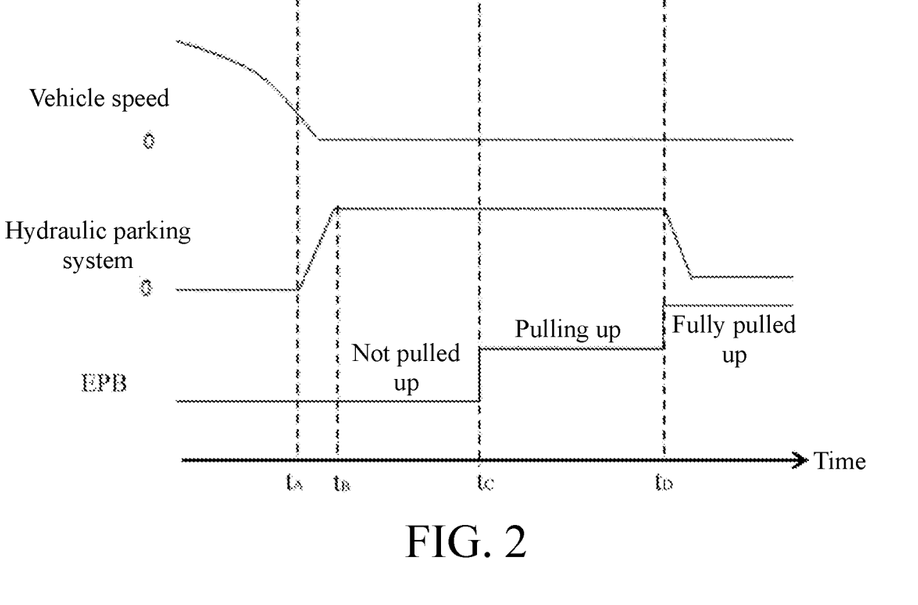
FIG. 2 shows states of a vehicle speed, a hydraulic parking system, and an electronic parking system in a stopping scenario in the embodiment of FIG. 1.

An embodiment of a vehicle control method in which the first control instruction is the stopping instruction is specifically described below in combination with FIG. 1 and FIG. 2. FIG. 2 shows states of a vehicle speed, a hydraulic parking system, and an electronic parking system in a stopping scenario in the embodiment illustrated in FIG. 1.

In step S110, at time $t_A$, a stopping instruction is received. The stopping instruction is sent by another controller (for example, another electronic control unit (ECU) or another domain control unit (DCU)) of the vehicle when the vehicle decelerates to a specific threshold. As shown in FIG. 2, before time $t_A$, the vehicle speed gradually decreases. Because neither the hydraulic parking system nor the electronic parking system is activated, a hydraulic pressure is zero, and the electronic parking system is also not pulled up.

However, the disclosure is not limited thereto, and the stopping instruction may alternatively be sent by another controller of the vehicle in another predetermined state. For example, when the vehicle is using an advanced driver assistance system (ADAS) function, once an ADAS failure is detected, the vehicle sends the stopping instruction immediately. In addition, the stopping instruction may alternatively be sent by a user through a human-machine interface (HMI), or sent in another manner.

In step S120, still at time $t_A$, a first output signal is sent to the hydraulic parking system based on the received stopping instruction, so that the hydraulic parking system starts pressure build-up. Then, the hydraulic parking system performs pressure build-up gradually, and at time $t_B$, the pressure build-up is completed.

In step S130, at time $t_C$, a second output signal is sent to the electronic parking system upon the hydraulic parking system reaching a predetermined first state, so that the electronic parking system starts to be pulled up.

In this embodiment, the first state of the hydraulic parking system may, for example, be that pressure build-up has been completed for a first time threshold. The first time threshold herein is a threshold predetermined for the hydraulic parking system, which may be any suitable time threshold such as 0 ms, 1 ms, or 2 ms. When the first time threshold is 0 s, once pressure build-up of the hydraulic parking system is completed, the second output signal is sent to start pulling up of the electronic parking system. In the embodiment illustrated in FIG. 2, after pressure build-up is completed at time $t_B$, the electronic parking system does not start to be pulled up until time $t_C$ (that is, the second output signal is not sent until time $t_C$). Thus, the first time threshold is $t_C$-$t_B$. In this way, the vehicle first gradually reduces a vehicle speed to zero through the hydraulic parking system, and then maintains a parked state through the electronic parking system. The hydraulic parking system can respond quickly and implements a specific slope of pressure build-up to provide users with a comfortable experience. In addition, maintaining stopping and parking in a manner of using the hydraulic parking system after using the electronic parking system may prevent a brake motor from overheating caused by a high hydraulic pressure for a long time.

In another embodiment, the first state of the hydraulic parking system may, for example, be that pressure build-up has not been completed after a second time threshold. The second time threshold is a time threshold predetermined for the hydraulic parking system, which may be any suitable time threshold such as 5 ms, 8 ms, or 10 ms. If the pressure build-up still fails to be completed when a pressure build-up duration exceeds the threshold, a failure may occur in the hydraulic parking system. In this case, the second output signal is sent to start pulling up of the electronic parking system, and stopping operation is completed under cooperation of the electronic parking system. Therefore, according to the vehicle control method in this embodiment, the electronic parking system can be started to perform stopping operation when the hydraulic parking system fails, implementing a failure backup of a system, and improving safety and reliability of the system.

It should be noted that, "the first state of the hydraulic parking system" is not limited to the above two states, but also includes any another suitable predetermined state associated with the hydraulic parking system.

In step S140, at time $t_D$, a third output signal is sent upon the electronic parking system reaching a predetermined second state, so that the hydraulic parking system starts to release pressure.

In this embodiment, the second state of the electronic parking system may, for example, be that the electronic parking system has been fully pulled up for a third time threshold. The third time threshold herein is a threshold predetermined for the electronic parking system, which may be any suitable time threshold such as 0 ms, 1 ms, or 2 ms. In the embodiment shown in FIG. 2, the third time threshold is 0 s, that is, once the electronic parking system is fully pulled up at time $t_D$, the third output signal is sent, so that the electronic parking system starts to release pressure. A manner of waiting for the electronic parking system to be fully pulled up and then releasing pressure of the hydraulic parking system can effectively avoid a problem of slippage that may be caused by direct release of pressure during pulling up of the electronic parking system.

It should be noted that, "the second state of the electronic parking system" is not limited to the state exemplified above, but includes any another suitable predetermined state associated with the electronic parking system.

Figure 3:
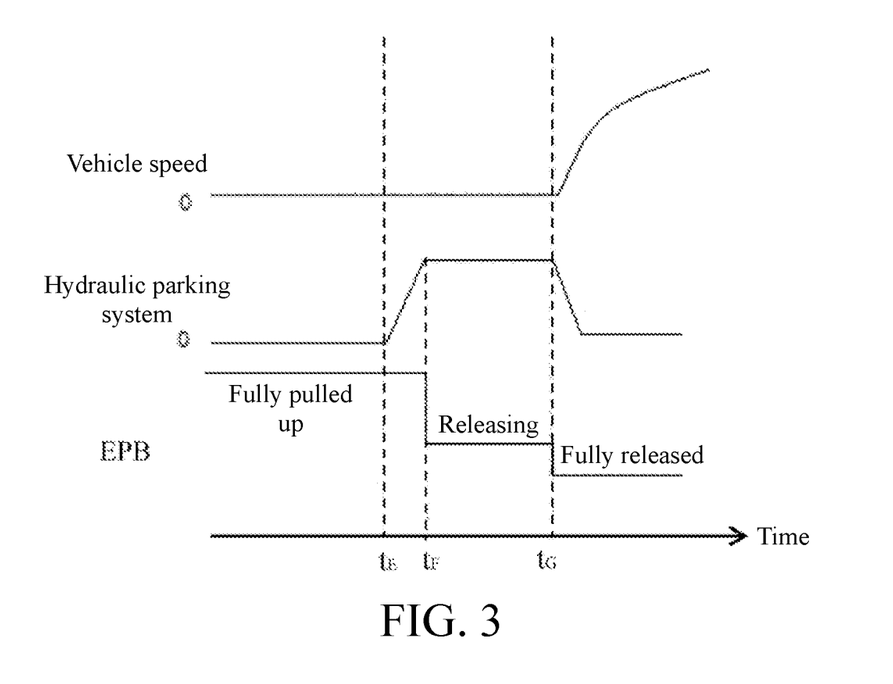
FIG. 3 shows states of a vehicle speed, a hydraulic parking system, and an electronic parking system in a starting scenario in the embodiment of FIG. 1.

An embodiment of a vehicle control method in which the first control instruction is the starting instruction is specifically described below in combination with FIG. 1 and FIG. 3. FIG. 3 shows states of a vehicle speed, a hydraulic parking system, and an electronic parking system in a starting scenario in the embodiment illustrated in FIG. 1.

In step S110, at time $t_E$, a starting instruction is received. The received starting instruction may be received from an HMI, or another controller (for example, a controller for an ADAS function) of the vehicle. When the starting instruction is received, as shown in FIG. 3, a vehicle speed is zero, a hydraulic pressure is zero, and the electronic parking system is in a fully pulled state.

In step S120, still at time $t_E$, a first output signal is sent to the hydraulic parking system based on the received starting instruction, so that the hydraulic parking system starts pressure build-up. Then, the hydraulic parking system performs pressure build-up gradually, and at time $t_F$, the pressure build-up is completed.

In step S130, at time $t_F$, a second output signal is sent to the electronic parking system upon the hydraulic parking system reaching a predetermined first state, so that the electronic parking system starts to be released. In this embodiment, the first state of the hydraulic parking system is that the electronic parking system starts to be released once the hydraulic parking system completes pressure build-up. However, the disclosure is not limited thereto, and the first state of the hydraulic parking system may alternatively be that pressure build-up has been completed for a fourth time threshold. The fourth time threshold herein is a threshold predetermined for the hydraulic parking system, which may be any suitable time threshold such as 0 ms, 1 ms, or 2 ms. In the embodiment shown in FIG. 3, the third time threshold is 0 s, that is, once pressure build-up of the hydraulic parking system is completed, the second output signal is sent to start releasing of the electronic parking system. A manner of waiting for the hydraulic parking system to complete pressure build-up and then releasing the electronic parking system can effectively avoid a problem of slippage that may be caused by directly releasing of the electronic parking system during starting. It should be noted that, "the first state of the hydraulic parking system" is not limited to the above state, but also includes any another suitable predetermined state associated with the hydraulic parking system.

Furthermore, in addition to being upon the hydraulic parking system reaching the predetermined first state, sending of the second output signal used to instruct the electronic parking system to start to be released may further be upon a starting torque being greater than a torque required to overcome a slope. This is because, in some scenarios, a vehicle may be parked on a slope, and release of the electronic parking system in this case not only needs to consider whether pressure build-up is completed, but also the torque required to overcome the slope, so as to avoid the problem of slippage.

In step S140, at time $t_G$, a third output signal is sent upon the electronic parking system reaching a predetermined second state, so that the hydraulic parking system starts to release pressure. In this embodiment, the second state of the electronic parking system may, for example, be that the electronic parking system has been fully released for a fifth time threshold. The fifth time threshold herein is a threshold predetermined for the electronic parking system, which may be any suitable time threshold such as 0 ms, 1 ms, or 2 ms. In the embodiment illustrated in FIG. 3, the fifth time threshold is 0 s, that is, once the electronic parking system is fully released at time $t_G$, the third output signal is sent, so that the hydraulic parking system starts to release pressure, and at the same time the speed of the vehicle began to increase and the vehicle starts to move. Thus, during releasing of the electronic parking system, a hydraulic pressure is maintained to avoid the problem of slippage. After the electronic parking system is fully released, the hydraulic parking system starts to release pressure, and the vehicle starts to move.

It should be noted that, "the second state of the electronic parking system" is not limited to the state exemplified above, but includes any another suitable predetermined state associated with the electronic parking system.

Figure 4:
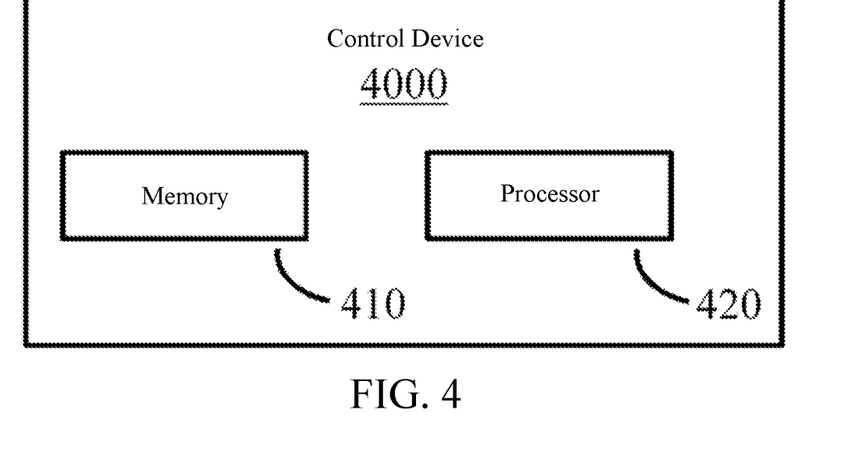
FIG. 4 is a block diagram of a vehicle control device 4000 according to an embodiment of the disclosure.

FIG. 4 is a block diagram of a vehicle control device 4000 according to an embodiment of the disclosure. The control device 4000 includes a memory 410 and a processor 420. Although not shown in FIG. 4, the control device 4000 further includes a computer program stored on the memory 410 and executable on the processor 420, thereby implementing various steps in the vehicle control method in the foregoing embodiments.

The memory 410 may be a random access memory (RAM), a read-only memory (ROM), an electrically programmable read-only memory (EPROM), an electrically erasable programmable read-only memory (EEPROM) or an optical disk storage device, a magnetic disk storage device, or any another medium capable of carrying or storing desired program code in the form of machine-executable instructions or data structures and capable of being accessed by the processor 420. The processor 420 may be any suitable dedicated or general-purpose processor such as a field-programmable gate array (FPGA), an application-specific integrated circuit (ASIC), or a digital signal processor (DSP).

In an application scenario of a vehicle, the control device 4000 may be a separate device used for control of a hydraulic parking system and an electronic parking system in a coupled manner, or may be combined in another processing device such as an ECU or a DCU.

Figure 5:
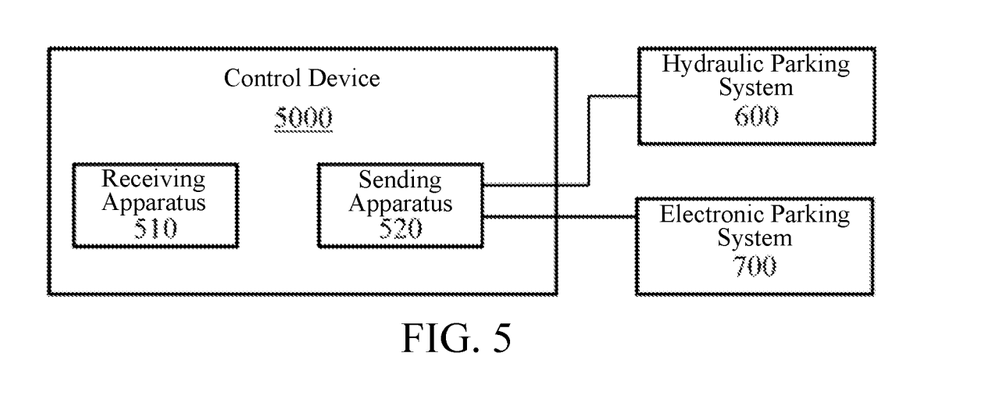
FIG. 5 is a block diagram of a vehicle control device 5000 according to an embodiment of the disclosure.

FIG. 5 is a block diagram of a vehicle control device 5000 according to an embodiment of the disclosure. The vehicle control device 5000 includes a receiving apparatus 510 and a sending apparatus 520.

Specifically, the receiving apparatus 510 is configured to receive a first control instruction. The first control instruction may be a stopping instruction, a starting instruction, and the like for a vehicle. Similar to that in the above embodiment, the stopping instruction may be sent by another controller (for example, another ECU or another DCU) of the vehicle, may be sent by a user through an HMI, or sent in another manner.

The sending apparatus 520 is configured to send a first output signal to a hydraulic parking system 600 based on the first control instruction received by the receiving apparatus 510. The first output signal is used to instruct the hydraulic parking system 600 to start pressure build-up. Herein, the sending apparatus 520 may directly send the first output signal to the hydraulic parking system 600 as shown in FIG. 5, or may indirectly send the first output signal to the hydraulic parking system 600 via a DCU or another ECU.

The sending apparatus 520 is further configured to send a second output signal to an electronic parking system 700 upon the hydraulic parking system 600 reaching a predetermined first state. The second output signal is used to instruct the electronic parking system 700 to start to be pulled up or released. Similar to the above description, the sending apparatus 520 may directly send the second output signal to the electronic parking system 700 as shown in FIG. 5, or may indirectly send the second output signal to the electronic parking system 700 via a DCU or another ECU.

In some embodiments where the first control instruction received by the receiving apparatus 510 is the stopping instruction, the second output signal is used to instruct the electronic parking system 700 to start to be pulled up. The first state of the hydraulic parking system 600 is, for example, that pressure build-up has been completed for a first time threshold; pressure build-up has not been completed after a second time threshold; or the like. The first time threshold and the second time threshold are time thresholds separately predetermined for the hydraulic parking system 600. The first time threshold may be any suitable time threshold, such as 0 ms, 1 ms, or 2 ms. When the first time threshold is 0 s, once pressure build-up of the hydraulic parking system 600 is completed, the sending apparatus 520 sends the second output signal to start pulling up of the electronic parking system. The second time threshold may be any suitable time threshold, such as 5 ms, 8 ms, or 10 ms. If the pressure build-up has not been completed when a pressure build-up duration exceeds the second time threshold, a failure may occur in the hydraulic parking system 600. In this case, the second output signal is sent to start pulling up of the electronic parking system 700, and stopping operation is completed under cooperation of the electronic parking system 700.

In some embodiments where the first control instruction received by the receiving apparatus 510 is the starting instruction, the second output signal is used to instruct the electronic parking system 700 to start to be released. The first state of the hydraulic parking system 600 includes that pressure build-up has been completed for a fourth time threshold. The fourth time threshold is a threshold predetermined for the hydraulic parking system 600, which may be any suitable time threshold such as 0 ms, 1 ms, or 2 ms. When the third time threshold is 0 s, as shown in FIG. 3, once pressure build-up of the hydraulic parking system 600 is completed, the second output signal is sent to start releasing of the electronic parking system 700.

Similar to the above description, "the first state of the hydraulic parking system" is not limited to the above state, but also includes any suitable predetermined state associated with the hydraulic parking system 600.

The sending apparatus 520 is further configured to send a third output signal to the hydraulic parking system 600 upon the electronic parking system 700 reaching a predetermined second state. The third output signal is used to instruct the hydraulic parking system 600 to start to release pressure.

In some embodiments where the first control instruction received by the receiving apparatus 510 is the stopping instruction, the second state of the electronic parking system 700 may, for example, be that the electronic parking system 700 has been fully pulled up for a third time threshold. The third time threshold herein is a threshold predetermined for the electronic parking system 700, which may be any suitable time threshold such as 0 ms, 1 ms, or 2 ms. For example, in the embodiment illustrated in FIG. 2, the third time threshold is 0 s, that is, once the electronic parking system 700 is fully pulled up at time $t_D$, the third output signal is sent, so that the hydraulic parking system 600 starts to release pressure.

In some embodiments where the first control instruction received by the receiving apparatus 510 is the starting instruction, the second state of the electronic parking system 700 may, for example, be that the electronic parking system 700 has been fully released for a fifth time threshold. The fifth time threshold herein is a threshold predetermined for the electronic parking system 700, which may be any suitable time threshold such as 0 ms, 1 ms, or 2 ms. In the embodiment illustrated in FIG. 3, the fifth time threshold is 0 s, that is, once the electronic parking system 700 is fully released at time $t_G$, the third output signal is sent, so that the hydraulic parking system 600 starts to release pressure.

Similar to the above description, "the second state of the electronic parking system" is not limited to the state exemplified above, but includes any another suitable predetermined state associated with the electronic parking system 700.

It should be understood that, some of the block diagrams shown in the accompanying drawings of the disclosure are functional entities and do not necessarily correspond to physically or logically independent entities. These functional entities may be implemented in the form of software, in one or more hardware modules or integrated circuits, or in different networks and/or processor apparatuses and/or micro-controller apparatuses.

It should also be understood that, in some alternative embodiments, the functions/steps included in the foregoing methods may not occur in the order shown in the flowchart. For example, two functions/steps shown in sequence may be executed substantially simultaneously or even in a reverse order. This specifically depends on the functions/steps involved.

In addition, those skilled in the art readily understand that the error detection method provided in the one or more embodiments of the disclosure can be implemented by using a computer program. For example, when a computer storage medium (for example, a USB flash drive) storing the computer program is connected to a computer, the vehicle control method in one or more embodiments of the disclosure can be performed by running the computer program.

To sum up, according to the vehicle control solution of an aspect of the disclosure, a hydraulic parking system and an electronic parking system are controlled in a coupled manner, implementing a function backup in a case of a single function failure, and providing a user with highly comfortable, reliable, and safe vehicle starting and stopping experience. According to the vehicle control solution of an aspect of the disclosure, a hydraulic parking system that has a fast response speed and performs pressure build-up with a specific slope can be first used to stop a vehicle, so as to provide a user with fast and comfortable stopping experience, and then an electronic parking system is used for keeping the vehicle stopped and parked, to prevent a motor from overheating caused by long-term operation of the hydraulic parking system. According to the vehicle control solution of an aspect of the disclosure, in a vehicle stopping condition, maintaining a hydraulic level of a hydraulic parking system during pulling up of the electronic parking system can effectively avoid a problem of slippage that may be caused by direct release of pressure during the pulling up of the electronic parking system. According to the vehicle control solution of an aspect of the disclosure, in a vehicle starting condition, a hydraulic parking system is first used for pressure build-up and a slope torque is considered, and then an electronic parking system is released, which can effectively avoid slippage possibly caused by direct release of the electronic parking system, improving safety of vehicle control.

Although only some implementations of the disclosure are described above, a person of ordinary skill in the art should understand that the disclosure may be implemented in multiple other forms without departing from the essence and scope of the disclosure. Accordingly, the presented examples and implementations are considered to be illustrative rather than restrictive, and the disclosure may encompass various modifications and replacements without departing from the spirit and scope of the disclosure that are defined by the appended claims.

What is claimed is:

1. A vehicle control method, comprising:
   receiving a first control instruction;
   sending a first output signal based on the first control instruction, wherein the first output signal is used to instruct a hydraulic parking system to start pressure build-up; and
   sending a second output signal upon the hydraulic parking system reaching a predetermined first state, wherein the second output signal is used to instruct an electronic parking system to start to be pulled up from an unpulled state or to be released from a fully pulled state, wherein when the first control instruction is a starting instruction:
   the sending of the second output signal is further upon a starting torque being greater than a torque required to overcome a slope,
   the first state of the hydraulic parking system comprises that the pressure build-up has been completed for a fourth time threshold, and
   the second output signal is used to instruct the electronic parking system to start to be released from a fully pulled state.

2. The vehicle control method according to claim 1, further comprising:
   sending a third output signal upon the electronic parking system reaching a predetermined second state, wherein the third output signal is used to instruct the hydraulic parking system to start to release pressure.

3. The vehicle control method according to claim 1, wherein
   when the first control instruction is the stopping instruction, the second output signal is used to instruct the electronic parking system to start to be pulled up.

4. The vehicle control method according to claim 3, wherein
   when the first control instruction is the stopping instruction, the first state of the hydraulic parking system comprises that pressure build-up has been completed for a first time threshold and pressure build-up has not been completed after a second time threshold.

5. The vehicle control method according to claim 3, wherein
   when the first control instruction is the stopping instruction, the second state of the electronic parking system comprises that the electronic parking system has been fully pulled up for a third time threshold.

6. The vehicle control method according to claim 1, wherein
   when the first control instruction is the starting instruction, the second state of the electronic parking system comprises that the electronic parking system has been fully released for a fifth time threshold.

7. A vehicle control device, comprising:
   a receiving apparatus, configured to receive a first control instruction; and
   a sending apparatus, configured to: send a first output signal based on the first control instruction, and send a second output signal upon a hydraulic parking system reaching a predetermined first state, wherein
   the first output signal is used to instruct the hydraulic parking system to start pressure build-up, and the second output signal is used to instruct an electronic parking system to start to be pulled up from an unpulled state or to be released from a fully pulled state, wherein when the first control instruction is a starting instruction:
   the sending of the second output signal is further upon a starting torque being greater than a torque required to overcome a slope, the first state of the hydraulic parking system comprises that the pressure build-up has been completed for a fourth time threshold, and the second output signal is used to instruct the electronic parking system to start to be released from a fully pulled state.

8. A vehicle control device, comprising a memory, a processor, and a computer program stored on the memory and executable on the processor, wherein when the computer program is executed by the processor, the vehicle control method according to claim 1 is implemented.

9. A vehicle, comprising a vehicle control device according to claim 8.

10. A computer-readable storage medium storing a computer program, wherein when the computer program is executed by a processor, the vehicle control method according to claim 1 is implemented.

* * * * *